INVENTOR.
OTTO GÜNTER FECHNER
WOLFGANG HEINRICH WALTER KADEN
MANFRED HANS ERICH RICHTER

INVENTOR.
OTTO GÜNTER FECHNER
WOLFGANG HEINRICH WALTER KADEN
MANFRED HANS ERICH RICHTER

United States Patent Office 3,326,380
Patented June 20, 1967

3,326,380
DIALYZER WITH VARIOUS CONNECTION
MEANS
Otto Günter Fechner, Karl-Marx-Stadt, Wolfgang Heinrich Walter Kaden, Bernsbach, Erzgebirge, and Manfred Hans Erich Richter, Halle, Saale, Germany, assignors to Paul Scheibner Kommanditgesellschaft, Bernsbach, Erzgebirge, Germany
Filed Feb. 1, 1965, Ser. No. 429,554
20 Claims. (Cl. 210—253)

The present invention relates to a dialyzer, and more particularly to a dialysing apparatus having parallel channels, separated by walls, for the passage of a liquid to be dialyzed and of a rinsing solution.

Dialyzers are known which must be considered assembled of individual partial units. These units serve, among others, for the operational steps of circulating the liquid to be dialyzed, storing or circulating the rinsing solution, maintaining or altering the temperature and the pressure of the liquid to be processed, separating air bubbles from the liquid, and bringing the latter together with the rinsing solution for the purpose of dialysis.

The last-mentioned unit is a system of parallel channels or chambers, separated by a semi-permeable dialysis membrane, and through which the liquid to be dialyzed as well as the rinsing solution pass. It is preferred to use a foil of cellulose hydrate in leaf form or in hose form as the dialysis membrane. The construction of the unit differs depending on the kind of dialysis wall or membrane used.

In one known design, the individual dialysis walls are incorporated in leaf form in a frame so that alternately the liquid to be dialyzed and the rinsing solution is conducted between the individual leaves. The arrangement is disadvantageous in that no liquid current builds up in the corners of the unit, so that coagulation may occur, for example, in the dialysis of blood.

Other dialyzer designs are based on the use of a dialysis hose which, for example, is wound on a cylinder. In one of these designs, the cylinder including the hose wound on it is arranged in a horizontally rotatable manner above a container in such manner that it immerses in the rinsing solution within the container.

In another design of known dialyzers, the hose is connected in spiraling fashion between two cylinders so as to lie between channels or chambers worked into the inner and outer cylinders, whereby the liquid to be dialyzed is conducted through the hose, and the rinsing solution through the channels or chambers.

It is characteristic of all these known apparatus that they are arranged to receive a certain predetermined amount or length of dialysis hose. In two of the units constructed as cylinders, the dialysis hose can be selected to be either 10 or 20 meters long. No intermediate or shorter lengths can be used. It is of considerable disadvantage that this predetermined amount of dialysis hose cannot be altered or adjusted to meet the conditions of the individual case of dialysis to be performed.

It is a further disadvantage of the units constructed as cylinders with channels cut into them that, in spite of their relatively large dimensions, resulting from the considerable length of dialysis hose accommodated, they must be made to exacting measurements because the latter govern the trouble-free operation of the apparatus. The complicated and close-tolerance machining of the cylinders increases production costs.

It is, moreover, disadvantageous in the majority of the models which became known so far that, due to the hydrostatic pressure caused by the construction of the systems, no real dialysis but actually merely a filtration takes place.

It is the object of the present invention to eliminate the disadvantages of hitherto known devices and to create a dialyzer which requires little space, is simple in construction, service and operation, and which is corrosion-resistant. Only industrially produceable, interchangeable components are used.

It is another object of the invention to provide a dialyzer in which a set of block-shaped members can be arranged in various set-ups, allowing different lengths of a dialysis hose to be used, according to the particular job to be performed.

It is yet another object to provide simple block members of a unitary shape and structure which can be used throughout the inventive dialyzer, without requiring numerous different shapes or elements.

It is a further object of the present invention to provide an S-shaped channel or passage, having a plurality of substantially parallel sections, through which a dialysis hose is guided, for the passage of the liquid to be dialyzed within, and the rinsing solution around it.

It is yet a further object to provide a dialyzer which allows ready inspection of both the set-up and the operation during dialysis, thus avoiding any disturbance or interruption of the process.

It is, finally, another object to provide a unit which lends itself for either serial or parallel connection with identical units, for purposes of lengthening the hose, providing parallel passages, or for ultrafiltration, as will be explained hereunder in more detail.

According to one of the main features of the invention, a box-shaped container is provided which is adapted to lodge a predetermined number of block-shaped members, between which a dialysis hose can be laid out in S-shape. Rearranging the set-up of the blocks allows a number of different hose lengths to be accommodated.

According to another feature, one type of elongated block member, and one type of semi-circular distance member is used exclusively, with the only difference that from the former, pairs of blocks at the beginning and the end of the hose path have portions machined off so as to provide a wedge-shaped clearance for connectors to be attached to the hose ends. From the latter, two smaller complementary members are formed to close off the corners of the set-up.

Yet another feature provides a plurality of apertures for the liquid to be dialyzed and for the rinsing solution, the former on one of the sides of the container and the latter in its water-tight, transparent cover. One of the liquid apertures and one of the solution apertures serves as an inlet, while the remaining apertures in each group can be selectively used as respective outlets; stoppers may be used in the apertures which are not connected.

Still another feature of the invention allows the rinsing solution to be circulated parallel or in countercurrent fashion with respect to the passage of the liquid to be dialyzed.

The afore-mentioned members support the dialysis hose within the container or box in such a manner that the S-shaped channel is of constant width. A plurality of horizontal ridges are provided in the member, forming channels therebetween, for the passage of the rinsing solution around and along the hose which is contacted by said ridges only. Transverse expansion of the hose is positively prevented by this arrangement.

It is yet another feature of the invention that the novel dialyzer allows various lengths of hose to be connected, in increments of about 10% to the total hose length that can be accommodated. For this purpose, the liquid apertures can be provided on both long sides of the container, so that selectively one, two or more channel sections can be connected. The even numbers of sections have outlet apertures on one side of the container, and for the uneven or odd numbers on the opposite side; the inlet is preferably always on the first-named side where 2, 4, 6, etc. channel sections may be connected. It is understood that the transparent cover may have a second set of corresponding apertures for the rinsing-solution outlets, or, be simply reversed as to sides, an extra aperture being then required for the solution inlet.

The invention will now be more fully explained, while other objects and advantages thereof can be appreciated and more fully understood, with reference to the following detailed description, when considered with the accompanying drawings, wherein FIG. 1 is a top plan view of the dialyzer according to the invention, with parts of the transparent cover broken away, and partly in section to show the inner structure;

Figure 1:
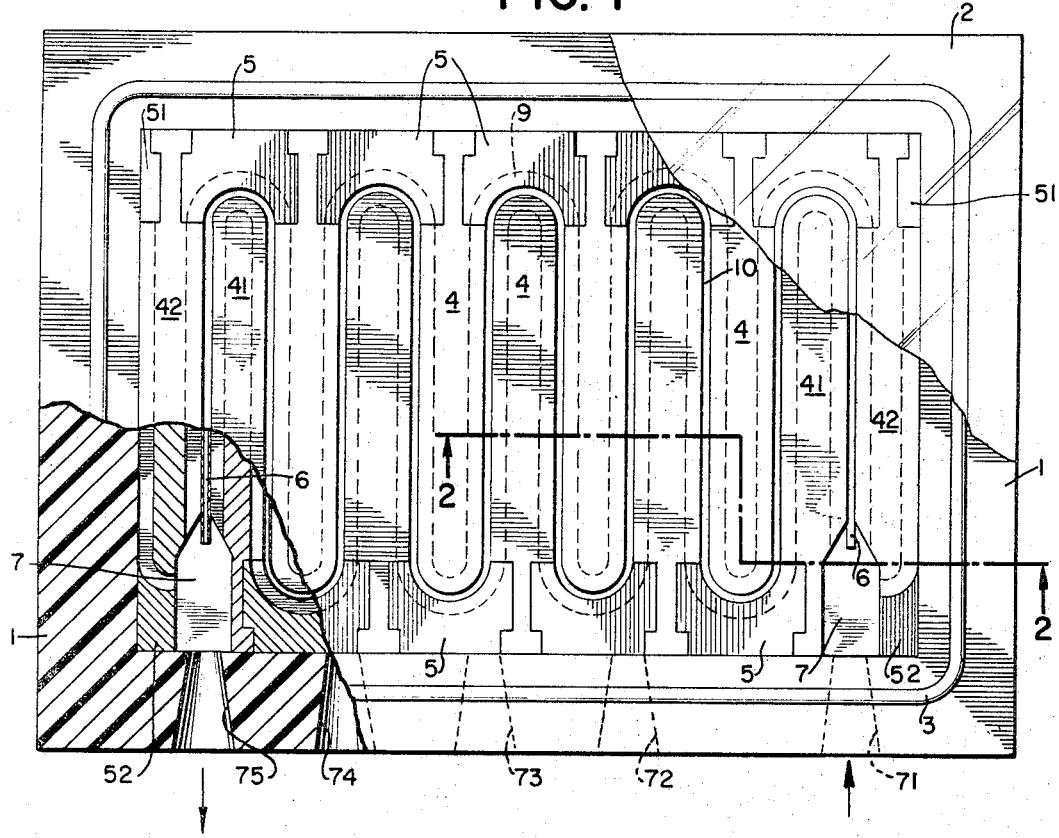
Figure 2:
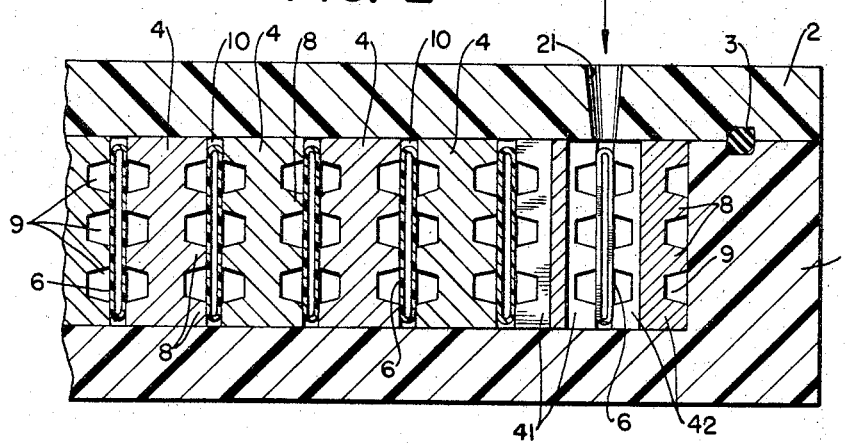
FIG. 2 is an enlarged vertical sectional and partial view, taken along line 2—2 of FIG. 1, showing the block members with their ridges, the channels therebetween and the dialysis hose inserted.

The dialyzer according to the invention comprises a rectangular, preferably elongated, box-like container 1 (shown in FIGS. 1 and 3), preferably made of transparent plastic material. A similarly transparent cover 2 (FIGS. 3-5) may be placed on the container 1. FIG. 2 illustrates how conventional packing means 3 may be provided, for example, in appropriate longitudinal recesses of both container 1 and cover 2. Clamping means (not shown) may be provided for holding the cover in tight fit on the container while dialysis is performed.

Inside the box or container 1, building block-like elongated members 4 and appropriately profiled semi-circular distance members 5 are arranged in spaced relationship. As best seen in FIG. 1, an S-shaped meandering channel 10 is formed between the members 4, 5, adapted to lodge a dialysis hose 6 which is preferably of a flat, band-like shape (see the cross section in FIG. 2). In a known manner, the hose may consist of cellulose hydrate, collodion or sometimes parchment or some other similar semi-permeable material through which dialysis will take place. The individual straight and semi-circular sections of channel 10 will be described somewhat later.

While the major, center part of the container 1 is set up with block members 4, and adjoining members 5 on both sides, outermost members 42 and intermediate members 41 have somewhat different profiles (FIG. 1). Similarly, distance members 5 do not extend all along the container but are flanked by specially shaped members 51, 52 above and below the members 42, respectively.

Between each pair of block members 41 and 42, a wedge-shaped space 7 is formed which serves as a connecting inlet or outlet for the liquid to be dialyzed. It should be noted that members 41, 42 need not be manufactured separately because they can be produced by machining off, in a predetermined angular arrangement, certain lateral portions which then form the space 7 with an adjoining machined-off member.

Figure 3:
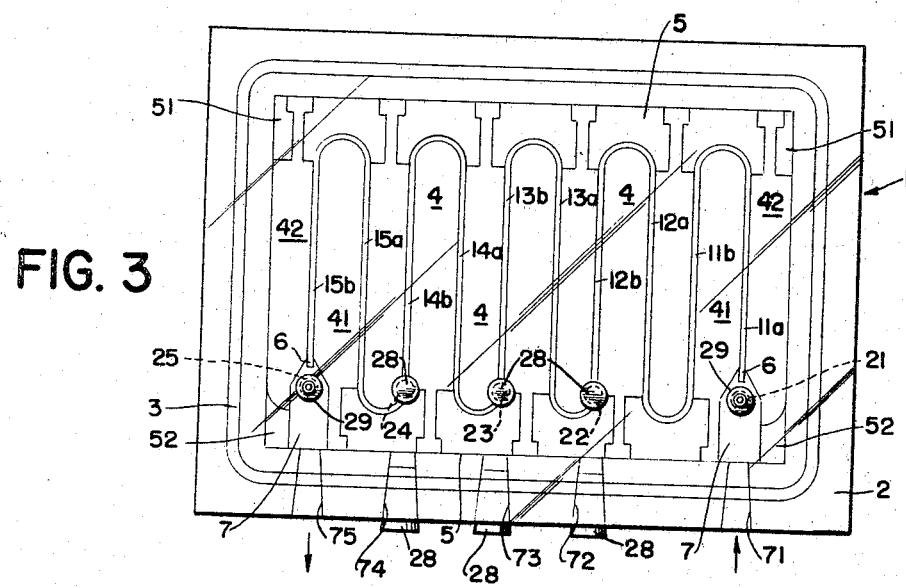
FIG. 3 is an exemplary set-up of the dialyzer, in a view similar to that of FIG. 1, but with the cover fully shown, for using the full length of the hose, with a total of 10 transversal straight channel sections.
Figure 4:
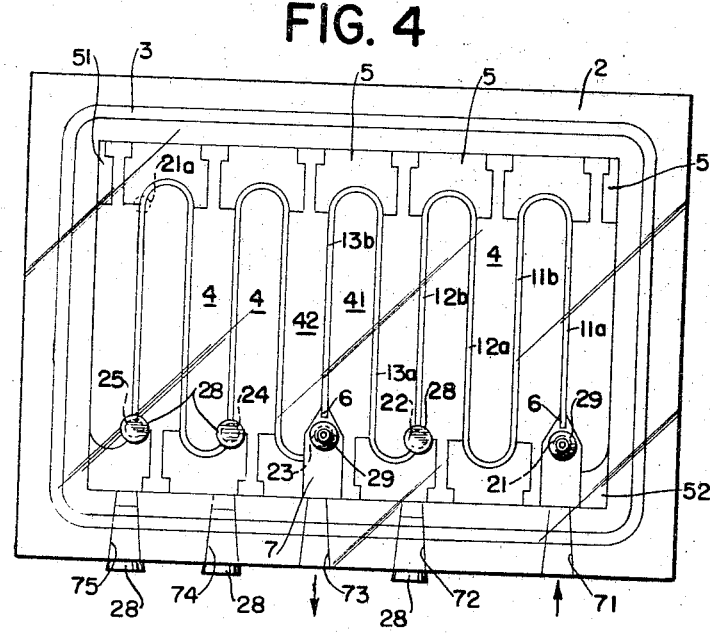
FIG. 4 is another set-up, in a view similar to FIG. 3 (but with a section broken away), for using 6 channel sections only.

Along at least one long side of the container 1, a number of orifices or apertures 71-75 are formed in the wall. In FIGS. 1, 3 and 4 these are only in the long-side wall appearing at the bottom of the figure, while in FIG. 5, both the top and bottom long walls have such apertures, as will be explained later. Aperture 71 can always serve as an inlet, while one of the remaining apertures 72-75 may be selected for an outlet. Conventional connecting pieces (not shown) may be used in spaces 7 for making connection through the apertures 71-75 with the hose 6 inside the dialyzer. These connecting pieces are then interconnected with the rest of the installation through which the liquid to be dialyzed will pass.

Figure 5:
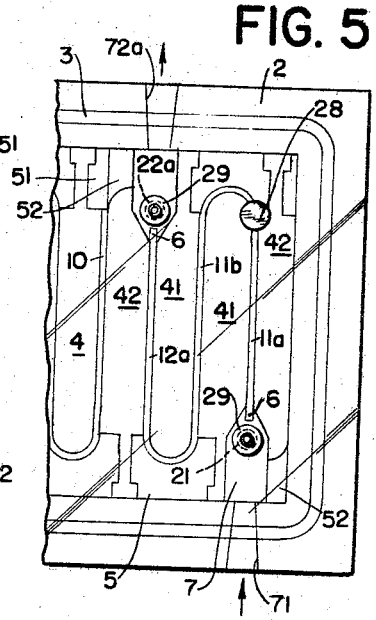
FIG. 5 shows a third set-up, similar to FIG. 4 but showing even less of the dialyzer, for using only 3 straight channel sections.

It will be explained later how the dialyzer is set up with the outlet at 75 (FIG. 3), alternately at 73 (FIG. 4), or even on the opposite side wall, at another outlet aperture 72a (FIG. 5). The length of hose which will be operative between the respective inlet and outlet points is, evidently, different and can be selected according to the particular dialysis job to be handled.

FIG. 3 shows that the cover 2 has a number of circular apertures therein for the rinsing solution, substantially aligned in location with the lateral wall apertures. Thus, cover aperture 21 is centrally located above space 7 beyond the inlet aperture 71, and apertures 22-25 align with respective wall apertures 72-75. In FIG. 3, aperture 25 registers with the space 7 inside outlet 75; in FIG. 4, aperture 23 is above the space 7 formed between members 41, 42 and registering with outlet 73. In FIG. 5, however, the cover has to be rotated about 180 degrees so that aperture 24 becomes what is denoted outlet 22a; in this case, an additional aperture will be required for the solution inlet 21 (shown at 21a in FIG. 4 with broken lines).

It is entirely possible to use a cover (not illustrated) which has rows of apertures for the rinsing solution along both long sides, so that the same cover suits all applications with even or odd numbers of channel sections. The unused apertures are, of course, closed with stoppers.

FIGS. 1 and 2 show that the side walls of members 4, 41, 42 and 5 have a number of horizontal webs or ridges 8 which define therebetween parallel channels 9. The aforementioned hose channel 10 is delimited by the ridges 8 which touch the dialysis hose 6 for centering and guiding the same. The parallel channels 9 thus form extensions of the vertical through channels and, in a way, of the spaces 7. It will be clear that the ridges 8 and channels 9 are on the outer sides of block members 4, 41 and 42, and on the inner, arcuate profiles of distance members 5, so as to form the continuous, meandering channel 10. Members 51, 52 do not have ridges or channels therein.

FIGS. 3, 4 and 5 illustrate the possible set-ups of the same dialyzer according to the invention. In the first alternative, shown in FIG. 3 (which is similar to FIG. 1), the container 1 is filled from wall to wall with block members 4, 41 and 42. The side walls have the complementary members 5, 51 and 52 arranged for proper spacing of the block members and of the hose therebetween. The liquid to be dialyzed enters through aperture 71 and space 7 thereat, passes through all ten straight channel sections (and through nine intermediate curved portions) so as to be discharged at aperture 75. The rinsing solution circulates through apertures 21 and 25, as has been explained before.

In the second alternative of FIG. 4, the number of block members 4 which take part in guiding the dialysis hose is reduced. While the liquid input is still at aperture 71, the specially shaped members 41, 42 are inserted about midway, so that aperture 73 becomes the liquid outlet. The channel 10, of course, accommodates a shorter dialysis hose 6. Rinsing in this case is via apertures 21 and 23.

The third alternative, illustrated in FIG. 5, shows a further shortening of the operative system inasmuch as no members 4 are used along the useful hose path. The sequence of the block members (from the right to the left, as viewed in the figure) is 42, 41, 41 and 42 again. The liquid input is at aperture 71; however, the outlet is at the aforementioned extra aperture 72a which is on the side of the container 1 opposite the aperture 72, 73, etc. While the reduced hose length of FIG. 3 corresponds to six straight channel sections, FIG. 5 allows the liquid to pass through three such sections only.

While the set-up of members 41, 42, 51 and 52 is always the same (for the embodiments of FIGS. 3, 4 and 5) in the right-hand section of the dialyzer, the space remaining in FIGS. 4 and 5 to the left of the member 42 providing the liquid outlet is filled up with the remaining members in any optional arrangement, making for the required tight fit between the adjoining members during dialysis. All the outlets and apertures which are not used in a particular set-up may be sealed off by means of plugs or stoppers, as shown at 28.

In the figures, the consecutive straight channel sections have been denoted 11a, 11b, 12a . . . through 15a, 15b. An even number of such sections (that is, two, four . . . through ten) can be used if the final members 41, 42 face the container side having the inlet aperture 71 thereat, that is, by using the respective outlet apertures 72, 73 . . . through 75. Conversely, an odd number of sections (e.g. three, five . . . nine) will be operative if the outlet apertures, like 72a, are used on the side opposite the inlet 71.

In FIG. 3, all sections 11a through 15b are used. In FIG. 4, the hose 6 only runs along sections 11a through 13b. Finally, in FIG. 5 sections 11a, 11b and 12a are used exclusively. It will be clear from this explanation that the length of the dialysis hose 6 can be altered in increments of 10% whereby the inventive dialyzer is most adaptable to various types of jobs of this kind.

Owing to their uniform size, the member 4, 41 and 42 can be inserted in either transversal direction (as shown by the alternating positions used in the various set-ups between adjoining members), and also face up or down (compare the respective positions of members 41, 42 between the left-hand and right-hand ends of FIGS. 1 or 3). Members 51 and 52 can also be reversed so as to fit the left or right corners of the container, as viewed in the drawings.

The dialyzer operates as follows: Depending upon the kind of dialysis to be performed and the liquid to be dialyzed, the required length of the hose 6 is determined. After connecting the beginning of the hose in a known manner to a conventional connecting piece, it is inserted in the still empty container 1, the connecting piece passing through the aperture 71; a stopper with a through hole can also be used (not shown).

Then the block and distance members 4, 5 are alternatingly inserted in the container, whereby simultaneously the hose 6 is laid into the respective sections of the channel 10 appearing between the member. It will be understood that at the beginning and the end of this work, a pair of members 41, 42 and appropriate distance members 51, 52 are used in the region of the inlet aperture 71, and at the particular outlet chosen for the job. Members 4 are always intermediate the closing pairs 41, 42. When the predetermined length of hose 6 is laid in, its end is again connected by conventional means, to be passed through one of the outlet apertures 72-75 (on one side), or 72a etc. (on the other).

If properly set up, the spaces 7 appearing between members 41, 42 will always align with one of the wall apertures (sideways) and also with one of the cover apertures (upwards). Thus, rinsing is performed along the same path as where the hose passes.

When the container is completely filled or lined with the members, the sealing cover 2 is applied and closed thereon by conventional means. The entire inner arrangement is clearly visible, even during the dialysis, through the transparent cover.

Hereafter supply and drainage nipples 29 for the rinsing solution are mounted in the appropriate ones of the cover apertures 21-25 or 22a. All unused outlets (e.g. 72-74 in FIG. 3 or 72, 74 and 75 in FIG. 4), as well as the unused corresponding rinsing apertures are then closed off in a water-tight manner by means of stoppers. Now the dialyzer can be prepared in a known manner for the dialysis, and connected to the existing installations.

During the use of the dialyzer, the liquid to be processed is always introduced through the aperture 71, whereupon it passes along the hose laid in the S-shaped channel 10 and is eventually discharged through the conventional connector used at one of the outlet apertures (75, 73 and 72a, as shown in FIGS. 3, 4 and 5, respectively).

The rinsing solution enters and leaves the dialyzer at the respective aligned apertures 21-25 and 22a of the cover. The solution flows around the connecting piece of hose 6 and is guided by space 7 into the parallel channels 9 so as to pass along both outer walls of the band-like hose 6 in the channel 10.

It should be emphasized that this may be done in either parallel or counter-current fashion with respect to the direction of flow of the liquid. The rinsing solution may enter at 21 (above liquid inlet 71) and be discharged at 25 (parallel to the liquid outlet 75). The inlet and outlet apertures may, however, be reversed for the rinsing solution, producing a counter-current flow in channel 10 with respect to the liquid in hose 6.

For expanding the variability of the dialysing hose length for particular applications, it is also possible to put several dialyzers according to the present invention in series connection, if the length of the hose has to be increased beyond that which single apparatus can accommodate. In other instances, however, several dialyzers can also be connected in parallel, making possible a considerable enlargement of the dialyzing area while simultaneously reducing the circulating velocity of the liquid under dialysis.

Furthermore, ultrafiltration is also possible by altering and appropriately setting up the pressure conditions and ratios. Thus, when several dialyzers are connected in parallel which have substantially the same pressure therein, one group may serve for dialysis while another group of dialyzers serves for ultrafiltration, a pressure differential being maintained between the units.

The foregoing disclosure relates only to a preferred embodiment of the invention, which is intended to include all changes and modifications of the exemplary apparatus described within the scope of the invention, as set forth in the appended claims. In particular, it should be mentioned that FIG. 5 shows only one extra aperture 72a on the upper long side of the container 1 while, as will be clear from the foregoing, any number of such apertures may be provided on this side, too.

What we claim is:

1. A dialyzer comprising a box-shaped container, a plurality of block-shaped guide members and distance members lodged in said container in spaced relationship so as to define a continuous channel therebetween, dialysis hose means being inserted in said channel, the walls of said container having an inlet aperture and at least two outlet apertures communicating with said channel for the passage of a liquid to be dialyzed through said dialysis hose means, the latter being attached to said inlet aperture and selectively connectable to one of said outlet apertures whereby to define predetermined variable lengths of said dialysis hose means.

2. A dialyzer as defined in claim 1, wherein said members have profiled peripheral portions facing each other, said channel being substantially in the form of an S-shaped serpentine, straight channel sections running along at least one side of said guide members.

3. A dialyzer as defined in claim 2, wherein said straight channel sections represent approximately one-tenth of the full channel length.

4. A dialyzer as defined in claim 2, wherein said channel has a constant width between adjoining members so as to provide a uniform lumen for said dialysis hose means.

5. A dialyzer as defined in claim 1, wherein said guide members have all identical shapes and sizes so as to be interchangeable, at least one of said guide members having a recessed portion in the region of said apertures so as to provide a clearance for attaching the ends of said dialysis hose means to a connection to an extraneous installation.

6. A dialyzer as defined in claim 1, wherein said distance members have all identical shapes and sizes so as to be interchangeable, further comprising complementary distance members along at least one side of said container.

7. A dialyzer as defined in claim 1, further comprising cover means for said container and sealing means arranged therebetween, at least said cover means being made of transparent material so as to allow the arrangement of said members in said container as well as the operation of the dialyzer to be observed at all times.

8. A dialyzer as defined in claim 1, wherein said members have longitudinally protruding ridges defining substantially parallel channels therebetween which communicate with predetermined ones of said apertures.

9. A dialyzer as defined in claim 8, where at least two adjacent guide members have recessed terminal portions for defining a clearance therebetween, said parallel channels communicating with said predetermined apertures through said clearance.

10. A dialyzer as defined in claim 9, further comprising means for passing a rinsing solution through said parallel channels.

11. A dialyzer as defined in claim 10, wherein said passing means are constituted by a cover means for said container and by at least two apertures in said cover means for introducing and discharging said solution.

12. A dialyzer comprising a box-shaped container, a plurality of block members and a plurality of distance members lodged in said container in spaced relationship so as to define therebetween a continuous channel of substantially S-shape, said members having profiled portions defining a number of parallel channels, a dialysis hose inserted in said continuous channel and contacting said profiled portions, two pairs of said blocks members having complementary recessed portions defining therebetween a space for lodging the respective ends of said dialysis hose, said container having an inlet opening and at least two outlet openings in the region of said space, a first path set up for a liquid to be dialyzed from said inlet opening at one end of said dialysis hose to the other end thereof and to one of said outlet openings, cover means for said container, said cover means having an inlet aperture and at least two outlet apertures in the region of said space, a second path set up for a rinsing solution from said inlet aperture to one of said spaces around one end of said dialysis hose, along at least some of said parallel channels, to another one of said spaces around the other end of said dialysis hose, and to one of said outlet apertures, whereby selectively parallel and counter-current flow can be set up in said paths during dialysis.

13. A dialyzer as defined in claim 12, wherein said continuous channel has a plurality of fractional sections, said at least two outlet openings and said outlet apertures registering with the ends of said fractional sections, whereby said dialysis hose can be inserted with varying lengths in accordance with dialysing tasks requiring the dialysing surface to vary at the ratio of one to ten.

14. A dialyzer as defined in claim 13, wherein said outlet openings and corresponding ones of said outlet apertures are at opposite sides of said container, said fractional sections running substantially perpendicular to said container sides, even-numbered fractional sections having their outlets on one side and odd-numbered fractional sections on the opposite side of said container.

15. A dialyzer as defined in claim 12, further comprising means for controlling the respective pressures and flow velocities in at least one of said paths.

16. A dialysing apparatus comprising, in combination, at least two dialyzers connected for joint operation each including a container, a plurality of block members and a plurality of distance members lodged in said container in spaced relationship so as to define a continuous, meandering channed therebetween, a dialysis hose being inserted in said channel, an inlet aperture and an outlet aperture in each one of said dialyzers, communicating with said dialysis hose, and cover means for water-tight sealing of said container.

17. A dialysing apparatus as defined in claim 16, wherein the inlet aperture of one of said dialyzers is connected with the outlet aperture of another one of said dialyzers for serial passage of a liquid therethrough which is to be dialyzed.

18. A dialysing appartaus as defined in claim 16, wherein the inlet apertures and the outlet apertures of all of said dialyzers are respectively interconnected for parallel passage of a liquid therethrough which is to be dialyzed.

19. A dialysing apparatus as defined in claim 16, wherein said cover means in each one of said dialyzers has an inlet opening and an outlet opening for a rinsing solution to be passed along said channel and outside said dialysis hose, the inlet opening of one of said dialyzers being connected with the outlet opening of another one of said dialyzers for serial passage of said solution irrespective of the selective serial and parallel passage of a liquid through said dialysis hose which is to be processed.

20. A dialysing apparatus as defined in claim 16, wherein said cover means in each one of said dialyzers has an inlet opening and an outlet opening for a rinsing solution to be passed along said channel and outside said dialysis hose, the inlet openings and the outlet openings of all of said dialyzers being respectively interconnected for parallel passage of said solution irrespective of the selective serial and parallel passage of a liquid through said dialysis hose which is to be processed.

No references cited.

REUBEN FRIEDMAN, *Primary Examiner.*

F. SPEAR, *Assistant Examiner.*